March 29, 1960 R. HANES 2,930,482
APPARATUS FOR TORSION-BREAKING EXTRUSION
RESIDUE FROM FINISHED PRODUCT
Filed Sept. 28, 1955 6 Sheets-Sheet 1

FIG. I

INVENTOR
RICHARD HANES, DECEASED,
BY BARBARA HANES, EXECUTRIX

BY Cushman, Darby & Cushman
ATTORNEYS

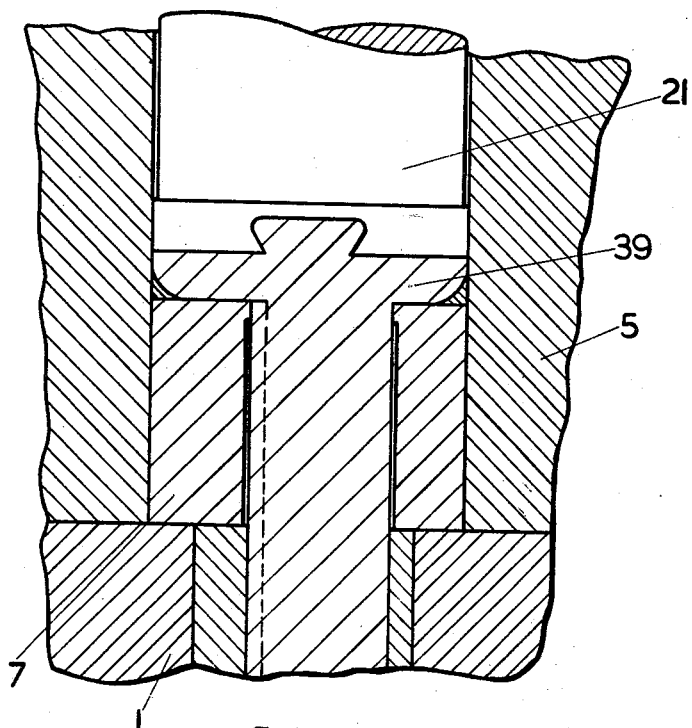
FIG. 2
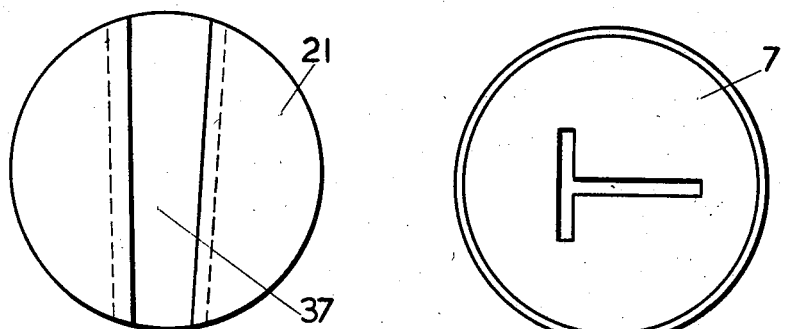
FIG. 3
FIG. 4
INVENTOR
RICHARD HANES, DECEASED,
BY BARBARA HANES, EXECUTRIX
BY Cushman, Darby & Cushman
ATTORNEYS

INVENTOR
RICHARD HANES, DECEASED,
BY BARBARA HANES, EXECUTRIX

INVENTOR
RICHARD HANES, DECEASED,
BY BARBARA HANES, EXECUTRIX
BY Cushman, Darby & Cushman
ATTORNEYS

INVENTOR
RICHARD HANES, DECEASED,
BY BARBARA HANES, EXECUTRIX

United States Patent Office 2,930,482
Patented Mar. 29, 1960

2,930,482

APPARATUS FOR TORSION-BREAKING EXTRUSION RESIDUE FROM FINISHED PRODUCT

Richard Hanes, deceased, late of Sutton Coldfield, England, by Barbara Hanes, executrix, Sutton Coldfield, England, assignor to Imperial Chemical Industries Limited, London, England, a corporation of Great Britain Application September 28, 1955, Serial No. 537,154

Claims priority, application Great Britain September 28, 1954

2 Claims. (Cl. 207—1)

This invention is concerned with processes for the direct extrusion of metallic billets, and is applicable to all cold direct extrusion processes and to those hot direct extrusion processes which employ a lubricant. The invention is specifically concerned with the removal of the butt which remains in the billet container after the extrusion of a billet.

In such processes for either cold or hot direct extrusion of metallic billets it is usual, for practical reasons, not completely to extrude the billet through the die. This means that a butt of metal attached to the extruded portion of the billet remains in the billet container. To obtain the extruded product it is usually necessary to separate the butt from the extruded product. When separation has been effected, the butt has to be removed from the billet container before another billet can be extruded. The methods employed hitherto for the removal of the butt have added to the time which is required to produce each extruded product.

It is an object of this invention to provide a new process for the direct extrusion of a metallic billet, which process readily enables a butt to be removed from a billet container.

According to this invention, a process for the direct extrusion of metal from a billet comprises extruding the metal by means of a punch which is so shaped at its operating end as to key to the end portion of the billet during the extrusion operation, separating the extruded portion from the unextruded portion of the billet after the extrusion operation, then retracting the punch to withdraw the separated unextruded portion of the billet and finally removing the unextruded portion from the punch.

Conveniently the keying of the punch to the end portion of the billet may be effected by forming a dovetail slot or projection across the end face of the punch. During the extrusion operation, metal is caused to flow into the slot or around the projection thereby locking the punch to the end portion of the billet so as to permit the subsequent removal of the butt from the billet container upon withdrawal of the punch. After withdrawal of the punch the butt may be readily removed therefrom by knocking it transversely out of the slot or from around the projection. For the convenience of the latter operation the slot or projection may be provided with tapered sides.

Separation of the extruded metal from the unextruded portion of the billet may be effected by sawing or shearing. The shearing may be carried out across the outer face of the die, for example, by means of a transverse movement of the die bolster. Alternatively, shearing may be effected on the inner face of the die by rotation of the punch and metal keyed thereto relatively to the die and metal remaining therein.

A process in accordance with the invention is suitable for the production of either solid-section or hollow-section extruded products. When separation is effected either by rotation or by die movement, it will be necessary, in the production of hollow-section extruded products, to withdraw the mandrel before such movement.

Three apparatuses suitable for carrying into effect processes in accordance with the invention will be described by way of example of the invention with reference to the accompanying drawings of which:

Figure 2 is a fragmentary view of Figure 1, showing the punch at the end of the extrusion operation;

Figure 3 is an underside view of the punch;

Figure 4 is a plan view of the die;

Figure 1:
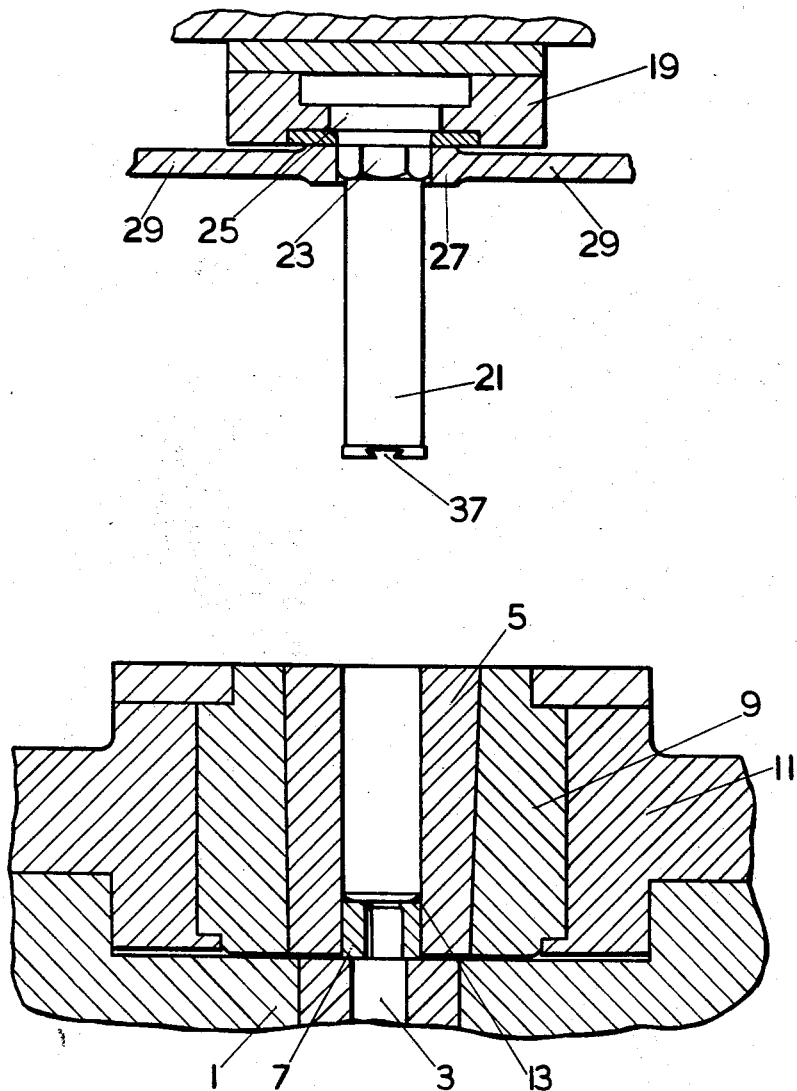
Figure 1 is a front elevational view, partly in section, of part of an apparatus for producing T-section extruded products, the extruding punch being in its uppermost position.

Referring to Figures 1 to 6 of the drawings, the apparatus is suitable for the production of T-section products and separation of the unextruded portion from the extruded portion of the billet is effected by rotation of the punch.

The apparatus, which is generally similar to a hydraulic press, comprises a bolster 1 having an opening 3 therein through which an extruded product can pass. The bolster supports a container 5, the lower part of which receives a die 7 and the remainder of which acts as a billet container. The container 5 is securely held in position by a tubular member 9 and an outside wall 11. A profiled ring 13 rests upon the die 7 and both fit tightly within the container.

Figure 5:
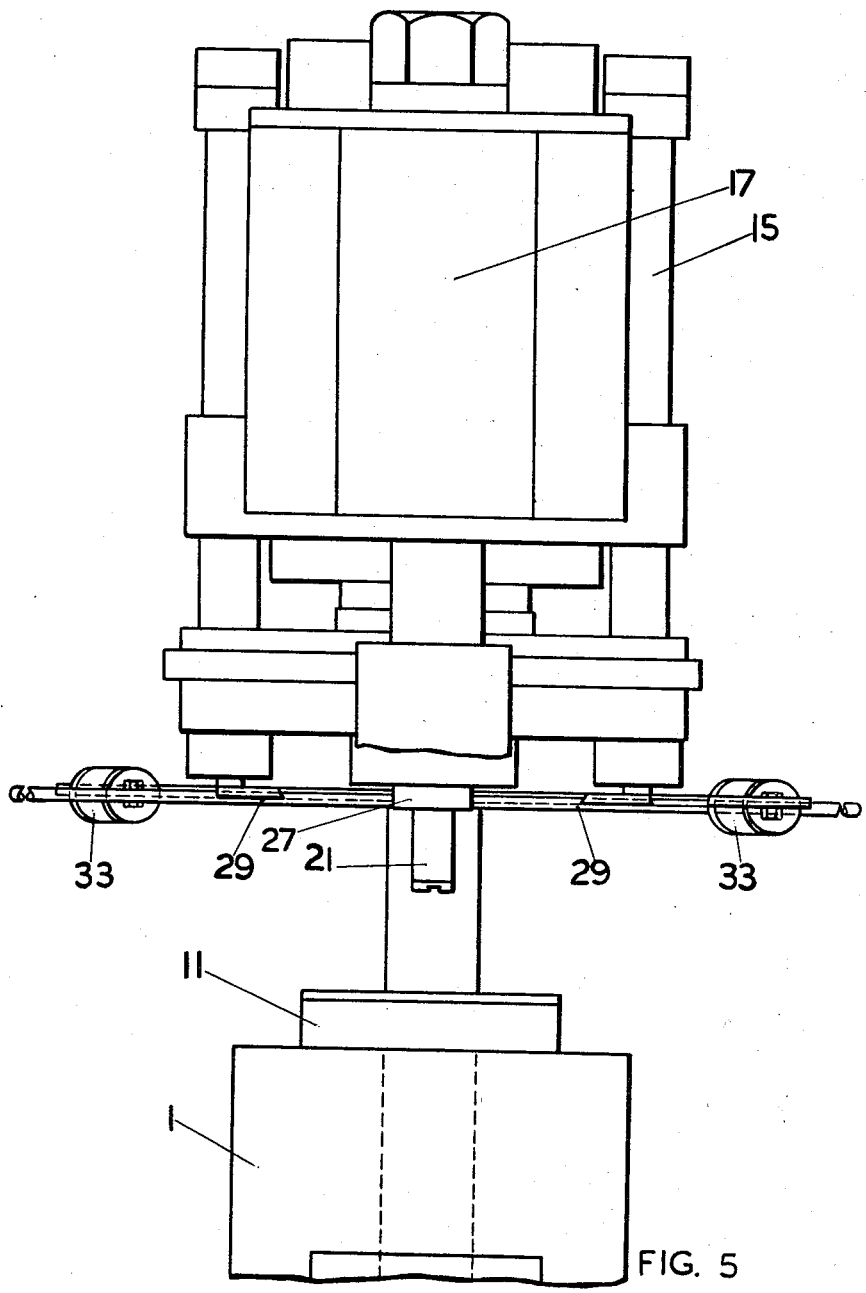
Figure 5 is an elevational view showing rotational means for separating the unextruded portion from the extruded portion of a billet.
Figure 6:
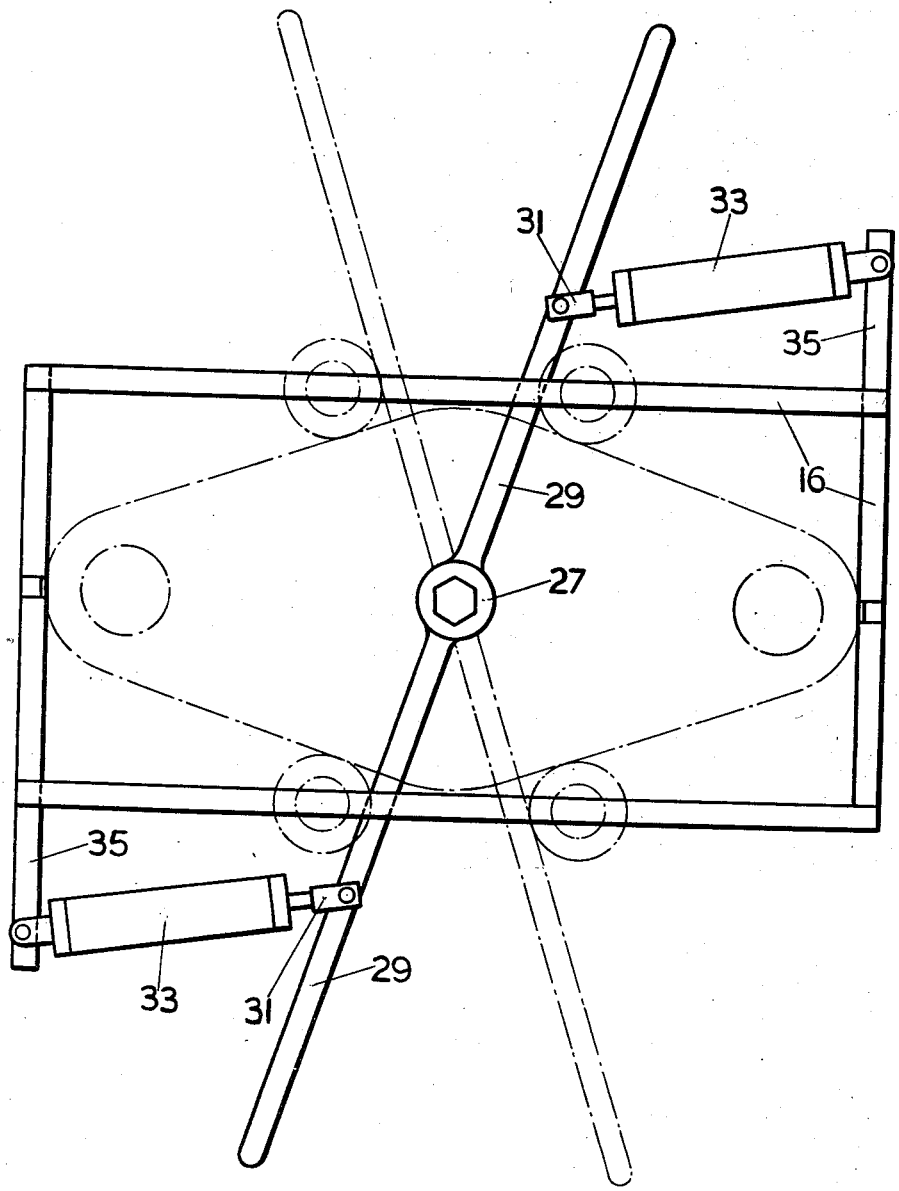
Figure 6 is an underside view of the rotational means.

The upper part of the apparatus, see Figure 5, includes a framework 15 supporting a hydraulic cylinder 17. A punch holder 19 co-operates with the cylinder 17. A punch 21 having at one end portion an enlarged portion 23 which is octagonal in section and having a further enlarged portion 25, which is circular in section, is rotatably mounted by means of portion 25 within the lower end portion of the punch holder 19.

An octagonal spanner 27, having two outwardly-extending lever arms 29, is tightly fitted about the enlarged portion 23. Each arm 29 is secured to one end of link 31 the other end of which is secured to a plunger (not shown) located inside a hydraulic pressure cylinder 33. The pressure cylinders 33 are supported by arms 35 secured to the framework 16.

The lower end of the punch 21 has a dovetail slot 37 which is of gradually increasing width as shown in Figure 3.

In operation, the apparatus at the commencement of an extrusion cycle, will be in the position shown in Figure 1. A solid billet is placed in the billet container adjacent the die 7. When the punch moves downwardly within the billet container the billet is extruded through the die, a smooth flow of the metal being ensured by the profiled ring 13. At the same time, metal of the billet flows into the dovetail slot whereby the end of the punch keys to the end of the billet.

At the end of the extrusion operation, a large part of the billet will have been extruded but a butt 39 remains in the billet container (see Figure 2). When the pressure on the punch has been removed but before the punch retracts, pressure is supplied to the cylinders 33. The spanner 27 and the punch 21 are thus caused to rotate. Since the section of the extruded portion is not circular, the butt, which is keyed to the punch and rotates with it, is separated from the extruded portion by severing.

When separation has occurred, the punch is retracted and during its retraction is caused to rotate back to its initial position by the pressure cylinders 33. When the punch has fully retracted, the butt can easily be removed from the punch by suitable sideways pressure since the dovetail slot is of gradually increasing width.

Figure 7:
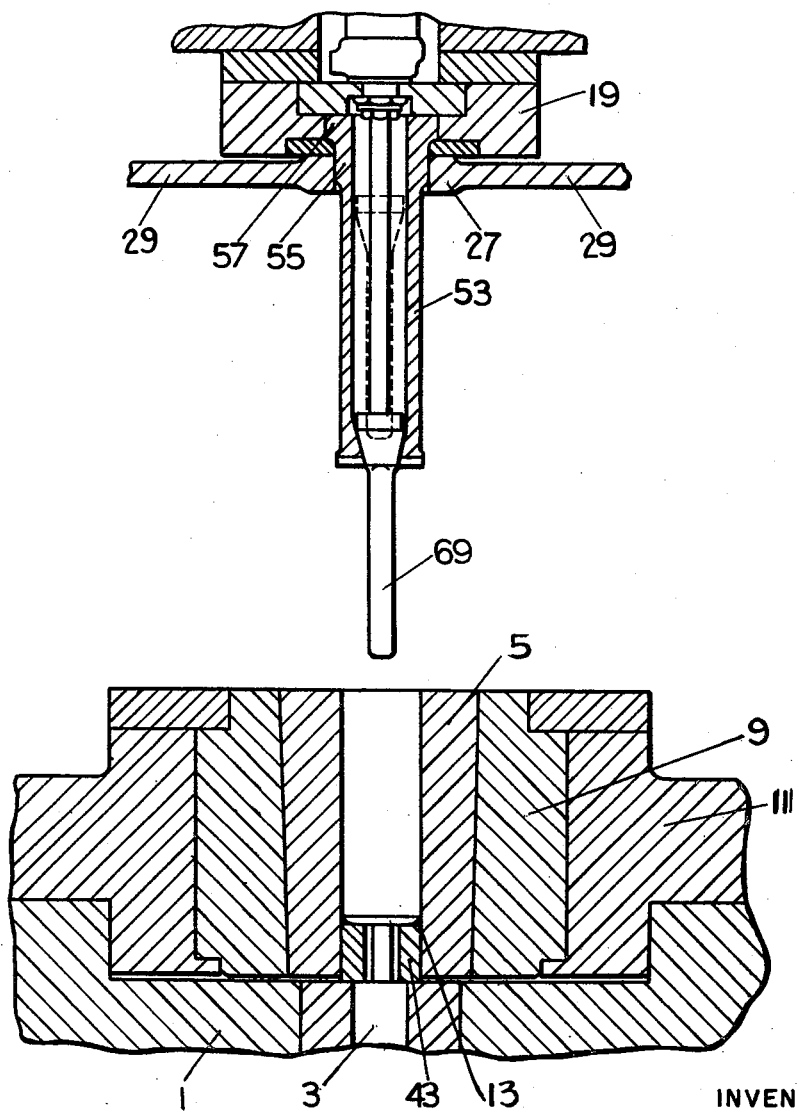
Figure 7 is an elevational view partly in section, of part of a second apparatus which is generally similar to the apparatus of Figure 1 except that it is suitable for the production of hollow-section extruded products.
Figure 8:
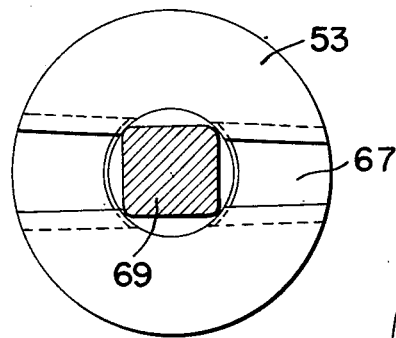
Figure 8 is an underside view of the punch of the second apparatus.
Figure 9:
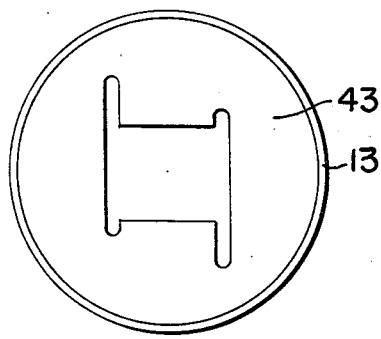
Figure 9 is a plan view of the die of the second apparatus.

The apparatus shown in Figures 7 to 9 is suitable for the production of hollow-extruded products. Referring to these three figures, the apparatus comprises a bolster 1 having an opening 3 therein through which an extruded product can pass. The bolster supports a container 5, the lower part of which receives a die 43 and the remainder of which acts as a billet container. The container 5 is securely held in position by a tubular member 9 and an outside wall 11. A profiled ring 13 rests upon the die 43 and both fit tightly within the container.

The upper part of the apparatus includes a framework supporting a hydraulic cylinder (not shown). A hollow punch 53 having at one end portion an enlarged portion 55, which is octagonal in section and a further enlarged portion 57, which is circular in section, is rotatably mounted, by means of portion 57, within the lower end portion of a plunger holder 19 working in the cylinder.

An octagonal spanner 27, having two outwardly-extending arms 29, is tightly fitted about the enlarged portion 55. The two arms 29 are connected to plungers (not shown) located inside hydraulic pressure cylinders (not shown).

The lower end of the punch 53 has a dovetail slot 67 which is of gradually increasing width as shown in Figure 8.

A mandrel 69, square in cross-section, is slidably mounted within the hollow punch 53 and the upper end of the mandrel is connected to a plunger (not shown) working inside a further hydraulic cylinder (not shown).

This apparatus operates in a similar manner to the apparatus described with reference to Figures 1 to 6 except that, before the punch rotates to sever the unextruded portion, the mandrel is retracted to the position shown dotted in Figure 7. If the mandrel were not retracted, the punch could not rotate.

Figure 10:
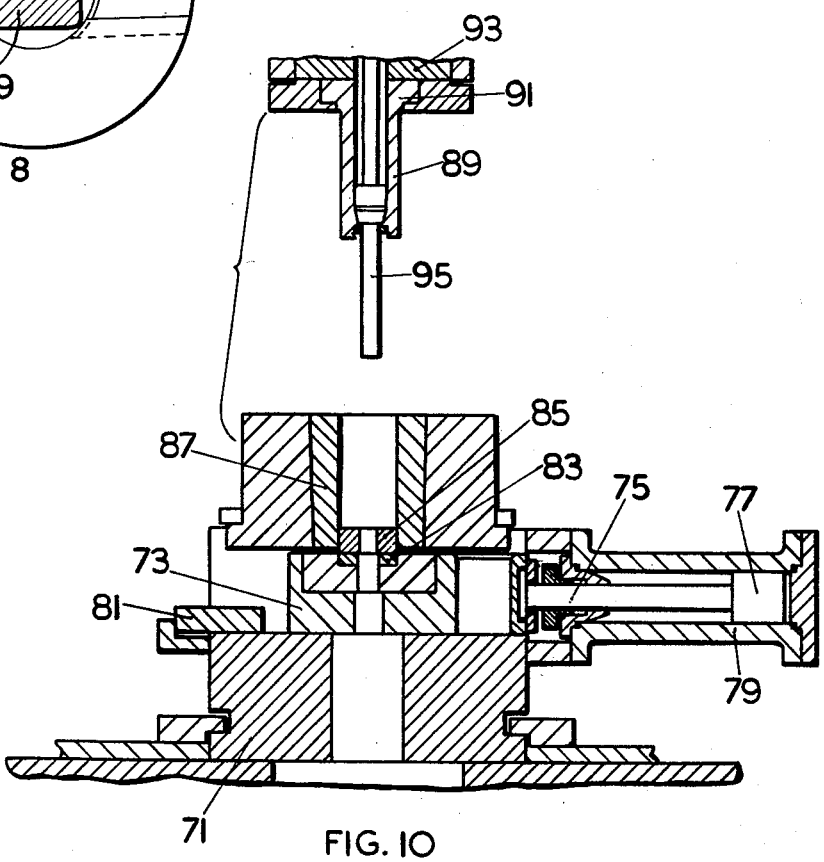
Figure 10 is an elevational view, partly in section, of a third apparatus for the production of hollow-section extruded products and in which separation of the unextruded portion from the extruded portion of the billet is effected by relative movement between the die and the bolster.

The apparatus shown in Figure 10 is generally similar to apparatus shown in Figure 7, the main difference being that the extruded portion is separated from the unextruded portion by sliding movement of the bolster with respect to the die.

The apparatus shown in Figure 10 comprises a bed 71 within the body of which a bolster 73 is slidably mounted. The bolster 73 is caused to move by means of a plunger 75 connected to a plunger head 77 working in a hydraulic cylinder 79. A stop member 81 limits the movement of the bolster. The bolster is provided with a hardened tubular insert 83 which is normally co-axial with a die 85. The die 85 is tightly mounted within the lower end portion of a container 87.

The punch 89 has a head portion 91 which is mounted within the lower end portion of a plunger 93 working in a hydraulic cylinder (not shown). A mandrel 95 passes through the punch 89 and is slidably mounted therein, being operated by a further hydraulic cylinder and piston arrangement. The lower end of the punch is provided with a dovetail slot which is of gradually increasing width.

When a billet has been substantially extruded, the mandrel is withdrawn, pressure is applied to the hydraulic cylinder 79 to cause the bolster to move with respect to the die. The hardened insert shears the extruded portion from the unextruded portion, the punch 89 retracts, taking with it the severed unextruded portion, and the bolster returns to its original position. The butt is then removed from the punch by suitable sideways pressure.

What is claimed is:

1. Apparatus for the direct extrusion of metal from a billet, said apparatus comprising; a billet container having an extrusion die opening of non-circular cross section, a punch, means mounting said punch for reciprocatory movement for extruding a billet within said container, and for rotation about its own axis, a head portion on said punch, said head portion having means thereon for gripping the end portion of a billet to render the billet integral therewith, means for reciprocating the punch, and means for relatively rotating said die and punch, and thereby relatively rotating the discard and extruded product of the billet to sever the discard from the product.

2. Apparatus for the direct extrusion of metal from a billet, said apparatus comprising; a billet container having an extrusion die opening of non-circular cross section, a punch, means mounting said punch for reciprocatory movement for extruding a billet within said container, and for rotation about its own axis, a head portion on said punch, said head portion having means thereon for gripping the end portion of a billet to render the billet integral therewith, means for reciprocating the punch, and means for rotating said punch relative to said die, and thereby relatively rotating the discard and extruded product of the billet to sever the discard from the product.

References Cited in the file of this patent

UNITED STATES PATENTS

| 365,473 | Hinsdale | June 28, 1887 |
| 1,366,693 | Kemble | Jan. 25, 1921 |
| 2,210,157 | Young | Aug. 6, 1940 |
| 2,243,031 | Fogg | May 20, 1941 |
| 2,638,985 | Ross | May 19, 1953 |
| 2,732,066 | Albers | Jan. 24, 1956 |
| 2,738,063 | Billen | Mar. 13, 1956 |
| 2,751,076 | Lombard | June 19, 1956 |

FOREIGN PATENTS

| 408,492 | France | Jan. 25, 1910 |
| 333,437 | Great Britain | Aug. 14, 1930 |
| 137,763 | Australia | June 28, 1950 |
| 730,062 | Great Britain | May 18, 1955 |